Jan. 17, 1933. J. A. SMITH 1,894,383
AUTOMOBILE BODY CONSTRUCTION
Filed March 13, 1931
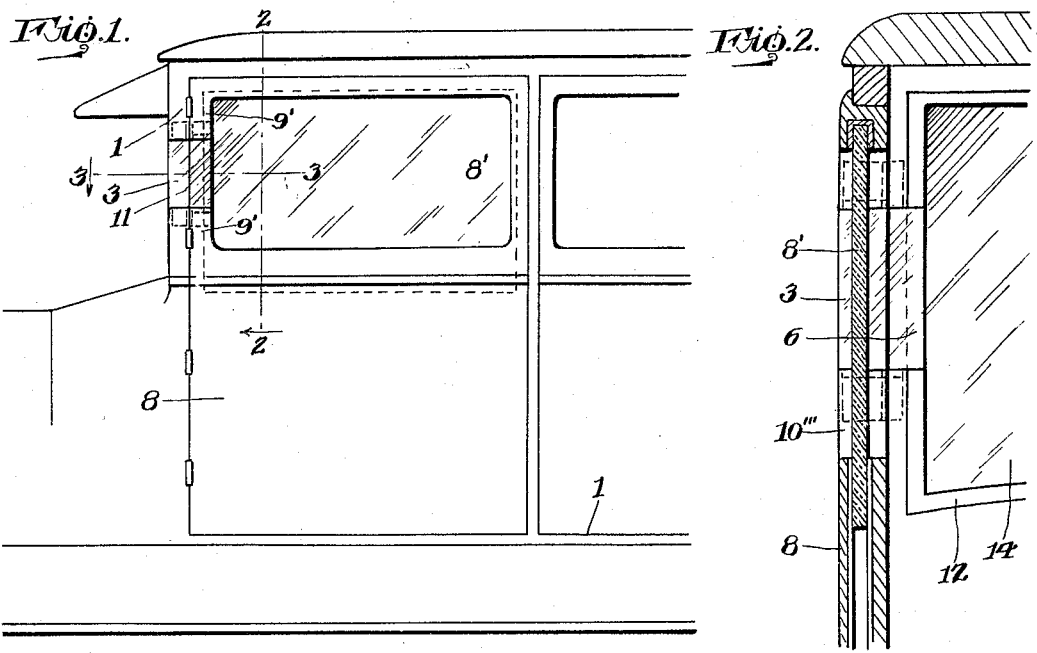
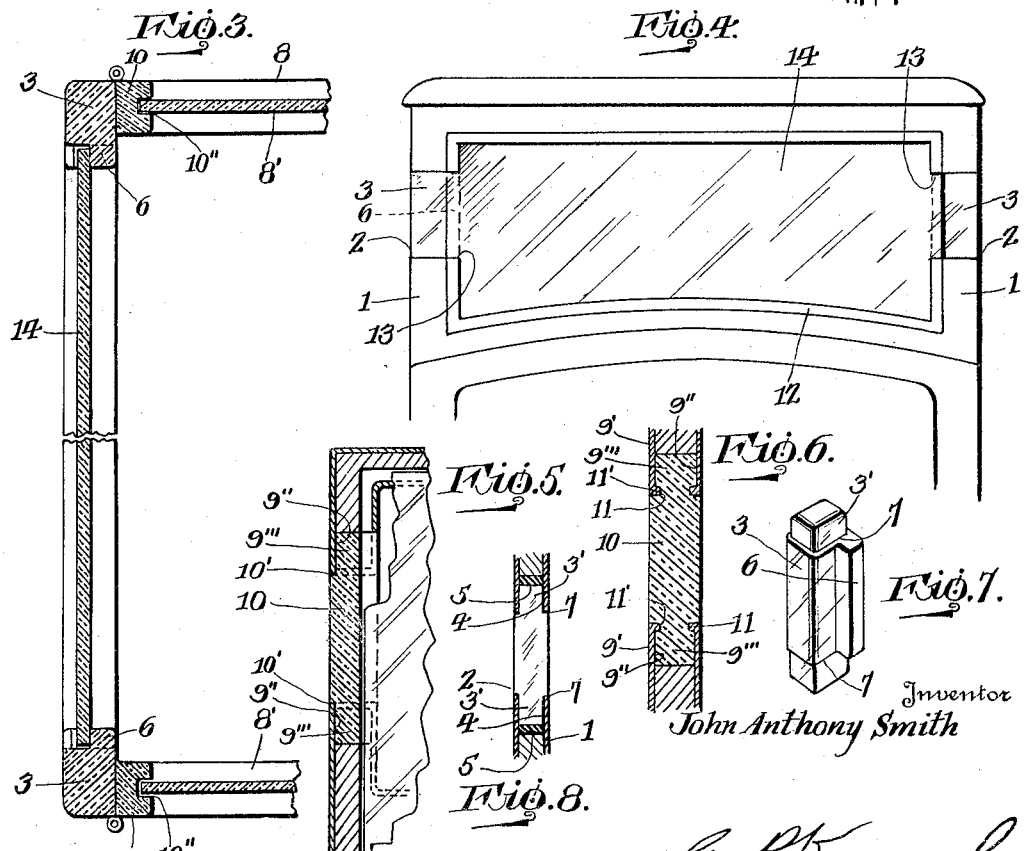
Inventor
John Anthony Smith
Geo. P. Kimmel
Attorney Patented Jan. 17, 1933

1,894,383

UNITED STATES PATENT OFFICE

JOHN ANTHONY SMITH, OF SPOKANE, WASHINGTON

AUTOMOBILE BODY CONSTRUCTION

Application filed March 13, 1931. Serial No. 522,395.

This invention relates to improvements in automobile body construction and has for its primary object to provide, in a manner as hereinafter set forth, an improvement of the character aforesaid whereby dead spots in the field of vision of the operator of an automobile may be eliminated, thereby materially reducing the likelihood of accidents and promoting the flow of traffic.

A further object of the invention is to provide an improvement of the character aforesaid which includes the provision of a transparent section for each of the front corner posts of an automobile body in order that the operator of the automobile may have a clear view obliquely to the direction of travel of the automobile.

With the foregoing and other objects in view, the invention consists of the novel construction, combination and arrangement of parts as hereinafter more particularly described, and shown in the accompanying drawing, but it is to be understood that the description and drawing are to be taken as illustrative rather than limitative.

In the accompanying drawing wherein like reference characters are employed to designate like parts throughout the several views:

Figure 1 is a fragmentary elevation of an automobile body embodying my invention.

Figure 2 is an enlarged section taken on the line 2—2 of Figure 1.

Figure 3 is an enlarged section taken on the line 3—3 of Figure 1.

Figure 4 is a fragmentary front elevation of the body.

Figure 5 is a fragmentary view in vertical section of one of the doors of the vehicle body.

Figure 6 is a fragmentary view in vertical section of one of the doors of the vehicle body and taken at right angles to Figure 5.

Figure 7 is a perspective view of the transparent section of a front post.

Figure 8 is a fragmentary sectional elevation of a front post showing the transparent section thereof in applied position.

Referring to the drawing in detail, the numeral 1 indicates the front posts of an automobile body, each of such posts having a central portion thereof cut away as indicated at 2 for receiving a transparent section 3, which may be formed of glass or other suitable material.

By way of example, each section 3 is shown of substantially rectangular contour in cross section although the same may be of any suitable cross sectional shape desired. The end portions of the section 3 are reduced as at 3′ and are inserted within recesses 4 formed in the corresponding post 1 above and below the cut away portion of the latter. The ends of that part of section 3 between the end portions 3′ has its outer face flush with the outer face of the post and abuts against the edges of the cut away portion 2. Preferably cushions 5 are disposed between the end faces of the portions 3′ of the sections 3 and the bottoms of the recesses 4. Formed on the inner side of the section 3 is a longitudinally extending rib 6. As shown the rib 6 extends from the inner end of one portion 3′ to the inner end of the other portion 3′ and projects beyond cut away portion 2. By providing section 3 with the end portions 3′ shoulders 7 are formed which abut against the edges of cut away portion 2. While the foregoing construction of the section 3, and the manner of connecting the same with the post 1, is preferable, the section 3 may be of any suitable shape and may be secured to the post 1 in any suitable manner.

The automobile body is of that type provided with a pair of front doors 8, only one of which is shown. The doors 8 are of that type provided with window openings closed by a vertically movable glass 8′. The doors are hinged at their forward sides of the frames of the window openings to the front posts 1. The forward sides of the frame of the window opening of each door is cut away as at 9 to correspond to the cut away portion 2 of a post 1 and to form such side with superposed spaced parts 9′. A socket 9″ is formed in each part 9′. Extending into the sockets 9″ are the reduced terminal portions 9‴ of a transparent frame section 10. The portions 9‴ provide shoulders 10′ which abut the edges of parts 9′. The section 10 is grooved as at 10″ which provides a continuation of grooves 10''' formed in parts 9'. The glass 8' is shiftable in through the grooves 10'' and 10''' to close the window opening. The section 10 between the reduced end portions 9'' thereof is flush with the outer faces of the parts 9'. The section 10 is transversely grooved as at 11 on its outer and inner side faces. The grooves 11 are arranged at the inner ends of the reduced portions 9'''. The sides of the parts 9' at their free ends are inturned, as at 11' into the grooves 11 to anchor section 10 to parts 9'. The section 10 when the door 8 is closed is flush with section 3 of the front post.

The windshield frame 12 of the body also is cut away as indicated at 12 to correspond with the cut away portions 2 and 9. The glass 14 of the windshield is positioned against the rib 6 when the windshield is closed. The rib 6 extends into the cut away portions 13 of the frame 12.

It will be apparent from the foregoing description that an automobile body embodying my transparent sections will afford the operator an unobstructed view throughout an arc of substantially 180 degrees, thereby rendering it practically impossible for any stationary or moving object to fall within the path of the automobile without being seen by the operator.

While the invention is herein illustrated and described in connection with an automobile body, it is to be understood that the same may be employed in connection with any moving body for which the same is found to be applicable, such as street cars, aeroplanes, motor boats and the like.

It is thought that the many advantages of an automobile body constructed in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. In automobile body construction, a pair of front corner posts having portions thereof within the line of vision of the operator cut away, a pair of doors having frame portions cut away adjacent the cut away portions of the posts, a windshield having frame portions cut way adjacent the cut away portions of the posts, and a transparent section disposed within said cut away portions of the posts and doors and coacting with the doors and windshield to provide the operator with an unobstructed view extending throughout an arc of substantially 180 degrees, the transparent portions in said posts formed with projections bearing against the windshield glass.

2. In automobile body construction, a pair of front corner posts having portions thereof within the line of vision of an occupant of the driver's seat cut away to form a pair of spaced, superposed sections, a pair of doors having the front sides of the window openings thereof cut away to form spaced, superposed sections having their opposed ends flush with the opposed ends of the sections of the posts, a windshield frame having its sides cut away to form spaced superposed sections having their opposed ends flush with the opposed ends of the sections of the posts, transparent sections interposed between and forming continuations of the sections of the posts and extending between the side sections of the windshield frame, and transparent sections interposed between the sections at the front sides of the window openings of the door and abutting and flush with said other transparent sections when the doors are closed.

3. In automobile body construction, a pair of front corner posts having portions thereof within the line of vision of an occupant of the driver's seat cut away to form a pair of spaced, superposed sections, a pair of doors having the front sides of the window openings thereof cut away to form spaced, superposed sections having their opposed ends flush with the opposed ends of the sections of the posts, a windshield frame having its sides cut away to form spaced superposed sections having their opposed ends flush with the opposed ends of the sections of the posts, transparent sections interposed between and forming continuations of the sections of the posts and extending between the side sections of the windshield frame, transparent sections interposed between the sections at the front sides of the window openings of the door and abutting and flush with said other transparent sections when the doors are closed, and the transparent sections between the sections of the posts provided with projections bearing against the windshield glass and positioned between the sections of the sides of the windshield frame.

4. In automobile body construction, a front corner post completely cut away intermediate the ends thereof, a windshield frame having a side thereof completely cut away intermediate its upper and lower ends, and a transparent section having a body part completely filling the cutout of the post and a lateral projection on the inner side of said body part completely filling the cutout of the side of the windshield frame.

5. In automobile body construction, a front corner post completely cut away intermediate the ends thereof, a windshield frame having a side thereof completely cut away intermediate its upper and lower ends, and a transparent section having a body part completely filling the cutout of the post and a lateral projection on the inner side of said body part completely filling the cutout of the side of the windshield frame, said projection having its front face flush with the front face of said body part and its rear face spaced forwardly of the rear face of the body part.

6. In automobile body construction, a front corner post completely cut away intermediate the ends thereof, a windshield frame having a side thereof completely cut away intermediate its upper and lower ends, a transparent section having a body part completely filling the cutout of the post and a lateral projection on the inner side of said body part completely filling the cutout of the side of the windshield frame, a door having a window opening, the forward side of the window frame completely cut away intermediate its ends, a transparent section completely filling the cutout of the forward side of the cutout of the window opening and being flush with said body part when the door is closed.

7. In automobile body construction, a front corner post completely cut away intermediate the ends thereof, a windshield frame having a side thereof completely cut away intermediate its upper and lower ends, a transparent section having a body part completely filling the cutout of the post and a lateral projection on the inner side of said body part completely filling the cutout of the side of the windshield frame, said projection having its front face flush with the front face of said body part and its rear face spaced forwardly of the rear face of the body part, a door having a window frame, the forward side of the window frame being completely cut away intermediate its ends, a transparent section completely filling the cutout of the forward side of the window frame and being flush with said body part when the door is closed.

In testimony whereof, I affix my signature hereto.

JOHN ANTHONY SMITH.